United States Patent [19]

Albus

[11] 4,193,115
[45] Mar. 11, 1980

[54] METHOD AND APPARATUS FOR IMPLEMENTATION OF THE CMAC MAPPING ALGORITHM

[75] Inventor: James S. Albus, Kensington, Md.

[73] Assignee: The United States of America as represented by the Secretary of Commerce, Washington, D.C.

[21] Appl. No.: 860,799

[22] Filed: Dec. 15, 1977

[51] Int. Cl.² .............................................. G06F 9/06
[52] U.S. Cl. ................................................... 364/300
[58] Field of Search ........................................ 364/300

[56] References Cited
PUBLICATIONS

Frye et al., Table Driven Break Offset Mapping, *I.B.M. Technical Disclosure Bulletin*, vol. 17, No. 4, Sep. 1974, pp. 1174–1175.

*Primary Examiner*—Raulfe B. Zache
*Attorney, Agent, or Firm*—Eugene J. Pawlikowski; Alvin J. Englert

[57] ABSTRACT

An adaptive control system is disclosed in which control functions involving many input variables are computed by referring to data stored in a memory. Each value of the control functions is distributed over a number of physical memory locations, such that the linear sum of the contents of these physical locations defines the value. An addressing algorithm is used in which the input variables are mapped into a set of intermediate mapping variables. Apparatus for accomplishing the intermediate mapping comprises first and second counters which are used to address a memory in which the intermediate variables are stored in a predetermined arrangement.

3 Claims, 10 Drawing Figures

METHOD AND APPARATUS FOR IMPLEMENTATION OF THE CMAC MAPPING ALGORITHM

FIELD OF THE INVENTION

The present invention relates generally to methods and apparatus for adaptive control systems, and more particularly to methods and apparatus for computer implementation of a mapping algorithm based on a neurophysiological theory of cerebellar function.

DESCRIPTION OF THE PRIOR ART

In the servo control of robot manipulators and other types of multivariant systems, the basic problem is to determine what each controlled actuator should do at every point in time and under every set of conditions. In the case of systems having many degrees of freedom operating simultaneously, as well as a large number of input variables, the computational difficulties involved in the mathematical solution of simultaneous equations become such that solutions often cannot be obtained by computer programs of practical speed and size unless most of the relevant variables are ignored.

Although computation by table reference techniques is well known in general, the methodology has heretofore seldom been cosidered practical for multivariant systems control, since N input variables having R distinguishable levels or values is equivalent to an unmanageably large $R^N$ number of potential inputs. However, theories of cerebellar function recently developed by the applicant and others have led to the development by the applicant of a memory management algorithm, and methods and apparatus for computer implementation thereof, which will be referred to hereinafter collectively as "CMAC" (Cerebellar Model Articulation Controller/Arithmetic Computer). This development allows control functions for many degrees of freedom operating simultaneously to be computed by table reference techniques in a memory of reasonable size.

Several aspects of CMAC have been partially described in four prior publications. CMAC was briefly referenced and described in an article by applicant and J. M. Evans, Jr. entitled "Robot Systems" which appeared in the February, 1976 issue of *Scientific American* at pages 77-86. CMAC has also been more extensively described in two articles by applicant entitled "Data Storage in the Cerebellar Model Articulation Controller (CMAC)", and "A New Approach to Manipulator Control: The Cerebellar Model Articulation Controller (CMAC)", both of which appeared in the September, 1975 *Journal of Dynamic Systems, Measurement, and Control*, at pages 228-233, and 220-227, respectively. Preliminary experimental results from a seven-degree-of-freedom manipulator operating under CMAC control have also been published as part of applicant's doctoral thesis, "Theoretical and Experimental Aspects of a Cerebellar Model", University of Maryland, December 1972. Each of the publications referred to hereinabove is hereby incorporated by reference in this application.

Briefly summarizing the previously published aspects of CMAC which are helpful to an understanding of the present invention, CMAC is a memory driven control system in which it is assumed that substantially less than $R^N$ inputs are ever used or needed for the execution of any single trajectory, and that for all trajectories within any given class, the sequences of joint actuator control signals are highly redundant. CMAC takes advantage of the redundancy in the data being stored by storing values of the control functions in a distributed storage memory over the range of input space which is needed for satisfactory performance.

Each input is treated as an address. The numerical contents of each address are distributed over a number of physical memory locations, such that the linear sum of the contents of these physical locations (referred to as weights) defines the value of the control function stored at that address. The CMAC addressing algorithm converts distance between input vectors into the degree of overlap between the sets of addresses where the functional values are stored. Stated differently, CMAC computes by transforming each input variable into a set of intermediate variables which are combined to select a unique set of weights. These weights are then summed to produce an output. The fact that each possible input vector selects a unique set of memory locations, rather than a unique single location, allows CMAC to generalize (produce similar outputs for similar inputs) by controlling the degree of overlap in the sets of memory locations which are selected for each input vector.

More specifically, CMAC accomplishes a mapping from input space to output space $$\underline{S} \to \underline{P} \text{ such that } \underline{P} = H(\underline{s})$$

where $\underline{S} = (S_1, S_2, \ldots S_N)$, an N-dimension input vector in which each variable $S_i$ is an "R-ary" variable having R separate resolution elements over the range thereof; and where $\underline{P} = (P_1, P_2, \ldots P_L)$, an output vector whose components $P_r$ are L output signals.

CMAC consists of a series of mappings:

$\underline{S} \to \underline{M}$
$\underline{M} \to \underline{A}$
$\underline{A} \to A_{P^*}$
$A_{P^*} \to \underline{P}$ The $\underline{S} \to \underline{M}$ mapping consists of N independent mappings, one for each of the variables $S_i$ in the $\underline{S}$ vector. Thus $$S \to M = \begin{cases} S_1 \to M_1 \\ S_2 \to M_2 \\ \vdots \\ S_N \to M_N \end{cases}$$

$M = (M_1, M_2, \cdots M_N)$, is is a vector of intermediate variables $M_i$, wherein each of the intermediate variables $M_i$ may be considered as a set of K covers $C_{ij}$, such that $$M_i = \{C_{i1}, C_{i2}, \ldots C_{iK}\}$$

and each cover $C_{ij}$ partitions the range of the variable $S_i$ into R/K intervals which are offset from the intervals of the other covers such that the range of the variable $S_i$ is partitioned into R resolution elements.

Alternatively, each of the intermediate variables $M_i$ may be considered as an ordered set (or vector) of binary digits $$M_i = \{B_{i1}, B_{i2}, B_{i3}, \ldots B_{i,R+K-1}\}$$

having the following characteristics:

1. Each digit $B_{ij}$ of the variable $M_i$ must have a value of "1" over one and only one interval within the range of $S_i$ and must be "0" elsewhere.

2. There must always be K "1"s in the variable $M_i$ for every value of the variable $S_i$.

3. There must be R different $M_i$ vectors corresponding to the R separate resolution elements of $S_i$ over its range.

The $S_i \rightarrow M_i$ mapping is such that each instantaneous value, or instantiation, of $S_i$ results in the production of a set of K binary digits in $M_i$ which are "1"s. Alternatively stated, the $S_i \rightarrow M_i$ mapping is such that each instantiation of $S_i$ results in the selection of a set of elements, one from each cover, which span the value of the variable $S_i$.

Hereinafter, the names of these non-zero digits in $M_i$ (the elements selected from the covers), are denoted $Q_{ij}$, and the set of $Q_{ij}$ is denoted $M^*_i$. Thus:

$$M^*_i = \{Q_{i1}, Q_{i2}, \ldots Q_{iK}\}.$$

$\underline{A} = (A_1, A_2, \ldots)$, an association vector consisting of binary elements $A_i$.

The $\underline{M} \rightarrow \underline{A}$ mapping consists of combining the elements $Q_{ij}$ from each of the sets $M^*_i$ so as to designate a set of K non-zero elements in the $\underline{A}$ vector. The set of names (or addresses) of the non-zero elements $a_j$ in $\underline{A}$ is denoted $A^*$. Thus:

$$A^* = \{a_1, a_2, \ldots a_K\}$$

where each $a_j$ is uniquely determined by all of the elements $Q_{1j}, Q_{2j}, \ldots Q_{Nj}$. For example, $a_j$ might be found by concatenation of corresponding elements from the sets of $M_i$, i.e., $$a_j = Q_{1j} Q_{2j} Q_{3j} \ldots Q_{Nj}$$

For any two input vectors $\underline{S}_1$ and $\underline{S}_2$, the number of elements in the intersection $A^*_1 \wedge A^*_2$ is roughly proportional to the closeness in input-space of the two input vectors regardless of the dimensionality of the input. The degree to which CMAC generalizes is determined by the shape of the input-space "neighborhoods". Two input vectors can be defined to be in the same neighborhood if $A^*_1 \wedge A^*_2$ is not null. The size of a neighborhood depends on the number of elements in the set $A^*$ and on the resolution with which each $S_i \rightarrow M^*_1$ mapping is carried out. The resolution of each $S_i \rightarrow M^*_i$ mapping is entirely at the discretion of the control system designer. In multidimensional input-space, the neighborhood about any input vector S may be elongated or shortened along different coordinate axes by using different resolution $S_i \rightarrow M^*_1$ mappings. A low resolution mapping in a particular dimension will elongate the input-space neighborhoods in that dimension and make the composition of the set $A^*$ weakly dependent on the input variables for that dimension (i.e., a large change in the input variable is required to produce a change in any of the elements of $A^*$), while a high resolution mapping will shorten the corresponding input-space neighborhood and make the composition of the set $A^*$ strongly dependent on the corresponding input variable (i.e., only a small change in the input variable is required to produce a change in one or more of the elements in $A^*$). If the resolution of a mapping is made low enough, the composition of set $A^*$ will be independent of the value of the input variable and the corresponding input-space neighborhood can be said to be infinite in that dimension. It is also possible to construct $S_i \rightarrow M^*_1$ mappings which are non-uniform, i.e., high resolution over some portions of the range of a particular dimension, and low resolution over other portions of the same dimension. By this means, neighborhoods can be made different sizes and shapes in various regions of the input-space.

Since the concatenations of the $M^*_i$ sets to obtain $A^*$ can produce an enormous number of associate cell names, a further mapping, $A \rightarrow A^*_p$, may be performed when it is not required for input vectors outside of the same neighborhood to have zero overlap, but merely a vanishingly small probability of significant overlap.

The $A \rightarrow A^*_p$ mapping is a many-into-few mapping from the large space of all possible addresses of the active elements, or associate cells, $a_j$ in the vector $\underline{A}$ into the address span of a memory of practical size defined by $A^*_p$. This may be accomplished by hash coding techniques. For example, if a hash coding routine B accepts $a_j$ as an argument and computes a pseudorandom number $\bar{a}_j$ which is uniformly distributed over the range defined by $A^*_p$ then $$A^*_p = \{\bar{a}_1, \bar{a}_2, \ldots \bar{a}_K\},$$

and $|A^*|$ = the number of elements in the set $A^*$, which also is equal to K.

The many-into-few property of the hash-coding procedure leads to "collision" problems when the mapping routine computes the same address in the smaller memory for two different pieces of data from the larger memory. Collisions can be minimized if the mapping routine is pseudorandom in nature so that the computed addresses are as widely scattered as possible. Nevertheless, collisions are eventually bound to occur, and a great deal of hash-coding theory is dedicated to the optimization of schemes to deal with them.

CMAC, however, can simply ignore the problem of hashing collisions because the effect is essentially identical to the already existing problem of cross-talk, or learning interference, which is handled by iterative data storage. In practice, this is not a serious problem so long as the probability of two or more different cells in $A^*$ being mapped into the same cell in $A^*_p$ is rather low, since it merely means that any weight corresponding to a cell in $A^*_p$ which is selected twice will be summed twice. The loss is merely that of available resolution in the value of the output.

A somewhat more serious problem in the $A \rightarrow A^*_p$ mapping is that it raises the possibility that two input vectors $S_1$ and $S_2$ which are outside of the same neighborhood in input-space might have overlapping sets of association cells in $A^*_p$. This introduces interference in the form of unwanted generalizations between input vectors which lie completely outside the same input-space neighborhood. The effect, however, is not significant so long as the overlap is not large compared to the total number of cells in $A^*_p$. In other words, spurious overlap is not a practical problem as long as $|A^*_{P1} \wedge A^*_{P2}| << |A^*|$ when $A^*_1 \wedge A^*_2 = \Phi$. For practical purposes, two input vectors can be considered to be outside the same neighborhood if they have no more than one active association cell in common. Thus, in practice, $100|A^*|$ association cells will perform nearly as well as $R^N$ association cells. If $|A^*_p|$ is made equal to $1000|A^*|$, the overlap problem virtually disappears entirely.

It is desirable to keep |A*| as small as possible in order to minimize the amount of computation required. It is also desirable to make the ratio |A*|/|A*$_P$| as small as possible so that the probability of overlap between widely separated $\underline{S}$ patterns is minimized. |A*$_P$|, of course, is limited by the physical size of the available memory. However, |A*| must be large enough so that generalization is good between neighboring points in input-space. This requires that no individual association cell contribute more than a small fraction of the total output. If |A*| ≥ 20, each association cell contributes on the average 5 percent or less of the output.

The K addresses computed by the A→A*$_P$ hash-coding procedure point to variable weights which are summed in an accumulator. The linear sum of these weights (perhaps multiplied by an appropriate scaling factor) is then an output driving signal P$_r$ used to power the rth joint actuator of the manipulator. The functional relationship $\underline{P}$=H($\underline{S}$) is the overall transfer function of the CMAC controller. The individual components of $\underline{P}$=(P$_1$, P$_2$, P$_3$, ... P$_L$) are the output drive signals to each individual joint where $$P_r = \sum_{j=1}^{K} W(r, \bar{a}_j)$$

and W is a matrix of weights which determine the function P$_r$=h$_r$($\underline{S}$). In general, each P$_r$ is a different function of the input vector $\underline{S}$ P$_r$=h$_r$($\underline{S}$)

r=1, ... L, where L is the number of outputs.

Figure 1:
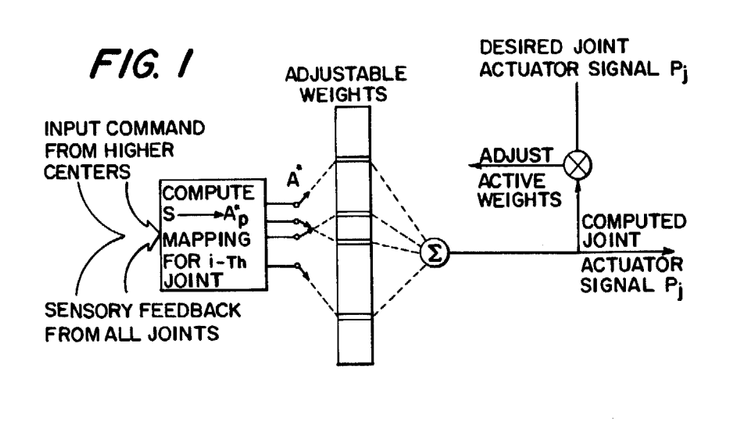
FIG. 1 is a simplified representational diagram of a CMAC system for a single joint of a manipulator.

FIG. 1 shows a block diagram of the CMAC system for a single controlled actuator, or joint. The components in this diagram are duplicated for each joint of the manipulator which needs to be controlled. Typically, the $\underline{S}$→A* mapping is different for each joint in order to take into account the different degrees of dependence of each P$_r$ on the various input parameters S$_i$. For example, an elbow control signal is more strongly dependent on position and rate information from the elbow than from the wrist, and vice versa.

The values of the weights attached to the association cells determine the values of the transfer functions at each point in input-space for any function h$_r$(S$_1$, S$_2$, S$_3$, ... S$_N$).

A procedure for finding a suitable set of weights which will represent a desired function over the range of the arguments is described in paragraph 2.1 of the article cited hereinabove entitled "Data Storage in the Cerebellar Model Articulation Controller (CMAC)". However, knowledge of this procedure is not necessary to an understanding of the present invention, and thus will not be discussed further here.

Commands from higher centers are treated by CMAC in exactly the same way as input variables from any other source. The higher level command signals appear as one or more variables in the input vector $\underline{S}$. They are mapped with an S$_i$→M*$_i$ mapping and concatenated like any other variable affecting the selection of A*$_P$. The result is that input signals from higher levels, like all other input variables, affect the output and thus can be used to control the transfer function $\underline{P}$=H($\underline{S}$). If, for example, a higher level command signal X changes value from X$_1$ to X$_2$, the set M*$_{X1}$ will change to M*$_{X2}$. If the change in X is large enough (or the X→M*$_X$ mapping is high enough resolution) that M*$_{X1}$ ∧ M*$_{X2}$=Φ, then the concatenation process will make A*$_{X1}$ ∧ A*$_{X2}$=Φ.

Thus, by changing the signal X, the higher level control signal can effectively change the CMAC transfer function. This control can either be discrete (i.e., X takes only discrete values X$_1$ such that M*$_{Xi}$ ∧ M*$_{Xj}$=Φ for all i≠j), or continuously variable (i.e., X can vary smoothly over its entire range). An example of the types of discrete commands which can be conveyed to the CMAC by higher level input variables are "reach", "pull back", "lift", "slap" (as in swatting a mosquito), "twist", "scan along a surface", etc.

An example of the types of continuously variable commands which might be conveyed to the CMAC are velocity vectors describing the motion components desired of the manipulator end-effector. Three higher level input variables might be $\dot{X}$, $\dot{Y}$, $\dot{Z}$ representing the commanded velocity components of a manipulator end-effector in a coordinate system defined by some work space. If $\dot{X}$, $\dot{Y}$ and $\dot{Z}$ are all zero, the transfer function for each joint actuator should be whatever is necessary to hold the manipulator stationary. If the higher center were to send $\dot{X}$=10, $\dot{Y}$=0, $\dot{Z}$=−3, then the transfer function for each joint should be such that the joints would be driven in a manner so as to produce an end-effector velocity component of 10 in the $\dot{X}$ direction, 0 in the $\dot{Y}$ direction and −3 in the $\dot{Z}$ direction.

The CMAC processor for each joint is thus a servo control system. The $\underline{S}$→A*$_P$ mapping, together with adjustment of the weights, define the effects of the various input and feedback variables on the control system transfer function. Inputs from higher centers call for specific movements of the end point. The CMAC weights are then adjusted so as to carry out those movements under feedback control.

SUMMARY OF THE INVENTION

The present disclosure relates to methods and apparatus for hardware implementation of CMAC, and of the CMAC $\underline{S}$→A*$_P$ mapping algorithm in particular. In accordance with one aspect of the invention, a method of obtaining A*$_P$ comprises the steps of:

(1) initializing an index j;

(2) performing for each S$_i$ variable the sequence of steps of:

(a) dividing the sum of (S$_i$+j) by the value of K, (b) obtaining the integer portion of the quotient from the division step (a), thereby obtaining a value T(S$_i$, j), (c) concatenating the T(S$_i$, j) value with the value of j, thereby obtaining a value representing the element Q$_{ij}$;

(3) concatenating each Q$_{ij}$ value such that a value corresponding to the element a$_j$=Q$_{1j}$ Q$_{2j}$ ... Q$_{Nj}$ is obtained;

(4) incrementing j by a factor of one;

repeating the sequence of steps (2)–(4) (K−1) times, thereby obtaining the set A*;

(5) hash-coding A* by using each element a$_j$ as an argument in a hash code procedure to obtain the elements $\bar{a}_j$ in A*$_P$.

In accordance with a further aspect of the invention, a method of obtaining A*$_P$ comprises the steps of:

for each S$_i$ variable:

(1) loading a first register having at least b+1 bits with a binary equivalent of the value of the S$_i$ variable, where b represents the number of bits in the binary equivalent of the largest of the values which an $S_i$ may obtain;

(2) initializing a second register having q bits, where $q = \log_2 K$, the contents of the second register constituting the count of an index j;

(3) obtaining a binary value corresponding to $Q_{ij}$ by outputting the contents of the second register as the lowest order bits of the $Q_{ij}$ value, and the contents of the $(b-q+1)$ bit locations of the first register as the highest order bits of the $Q_{ij}$ value;

(4) transferring all of the $Q_{ij}$ values into a shift register having $N(b+1)$ bits such that the shift register contains a value corresponding to the concatenation of the $Q_{ij}$ values representing the element $a_j$;

(5) shifting the contents of the shift register into a cyclic shift register connected so as to produce a pseudorandom number as a result of a shifting of the contents thereof, thereby obtaining a value corresponding to $\bar{a}_j$;

(6) changing the contents of the first and second registers by incrementing or decrementing the value thereof by a factor of one;

(7) repeating for each $S_i$ the sequence of steps (3)–(6) $(K-1)$ times, thereby obtaining the values of all the elements $\bar{a}_j$ in $A^*_P$.

In accordance with a still further aspect of the invention another method of obtaining $A^*_P$ comprises the steps of:

(1) loading a first register having at least $b+1$ bits with the equivalent of the value of the first $S_i$;

(2) initializing a second register having q bits, the contents of the second register constituting the count of an index j;

(3) initializing a third register having r bits, where $r = \log_2 N$, the contents of the third register constituting the count of an index i;

(4) initializing a queue of K storage registers, the queque being constructed such that the entry of a value into the first register thereof causes the contents of each queue register containing a value to be shited into the next succeeding queue register;

(5) obtaining a binary value by outputting the contents of the second register as the lowest order bits of the binary value, outputting the contents of the $(b-q+1)$ highest order bits of the first register as the next lowest order bits of the binary value, and outputting the contents of the third register as the highest order bits of the binary value;

(6) addressing a memory in which is stored a table of pseudorandom numbers with the binary value, thereby obtaining a value corresponding to $\overline{Q}_{ij}$;

(7) (a) exclusive-oring the $\overline{Q}_{ij}$ value which is obtained with the contents of the Kth register of the queue, (b) entering the result obtained from the exclusive-oring step (a) in the first register of the queue;

(8) changing the contents of the first and second registers by incrementing or decrementing the value thereof by one;

(9) repeating the sequence of steps (5)–(8) $(K-1)$ times, thereby resulting in K values corresponding to $\overline{Q}_{i1} \ldots \overline{Q}_{iK}$ being entered into the queue;

(10) changing the contents of the third register by incrementing or decrementing the value thereof by one;

(11) loading the first register with the value of the next succeeding $S_i$, initializing the second register;

(12) repeating the sequence of steps (5)–(11) $(N-1)$ times, such that the Kth queue register contains a value corresponding to the first element $\bar{a}_j$ of $A^*_P$, the $(K-1)$th queue register contains a value corresponding to the second element $\bar{a}_j A^*_P$, and so on to the first queue register, which contains a value corresponding to the Kth element $\bar{a}_K$ of $A^*_P$.

In accordance with another aspect of the invention, a method of implementing the $S \rightarrow A^*_P$ mapping comprises the steps of:

(1) initializing a queue of K storage registers, the queue being constructed such that the entry of a value into the first register thereof causes the contents of each queue register containing a value to be shifted into the next succeeding queue register, (2) initializing a cyclic shift register having K bits and which is connected so as to produce a pseudorandom number as a result of a shifting of the contents thereof, and, for each $S_i$, (3) loading an addressing register having at least $b+1$ bits with the binary equivalent of $S_i$, (4) addressing an addressable memory having a plurality of memory locations in which a set of pseudorandom numbers are stored, the numbers in the set being unique and uniformly distributed over the range of the values which the elements $\bar{a}_j$ may assume, and each memory location being addressed by a unique address line which is defined by the contents of the $(b-q+1)$ highest order bit locations of the addressing register, (5) performing a first exclusive-or operation wherein the output of the memory location addressed by the addressing of step (4) is exclusive-ored with the output of the cyclic shift register, (6) performing a second exclusive-or operation wherein the result obtained from the first exclusive-or operation of step (5) is exclusive-ored with the contents of the Kth register in the queue, (7) entering the result obtained from the second exclusive-or operation of step (6) into the first register of the queue, (8) shifting the shift register so as to produce a new pseudorandom number, (9) changing the contents of the addressing register by incrementing or decrementing the value thereof by a factor of at least one, (10) repeating steps (5) through (9) $(K-1)$ times, (11) loading the addressing register with the next $S_i$, (12) repeating steps (5) through (11) $(N-1)$ times, such that values representing $\bar{a}_j$ through $\bar{a}_K$ are stored in the queue of registers with the $\bar{a}_j$ value in the last register of the queue and the $\bar{a}_K$ value in the first register of the queue following the last repetition of the storing step.

Other features and advantages of the invention will be set forth in, or apparent from, the detailed description of preferred embodiments found hereinbelow.

DETAILED DESCRIPTION OF THE PREFERRED EMBODIMENTS

Although hardware implementation of CMAC is facilitated if K is an integer power of two, it is to be noted at the outset that K need not be an integer power of two. It is sufficient that for every value of $S_i$ there exists a unique set of K elements $M^*_i$, such that the value of $S_i$ uniquely defines the set $M^*_i$, and vice versa. Generically, the $\underline{S} \to M$ mapping may be characterized as a "cover" process in which the range R of distinguishable values which an input variable $S_i$ may assume is covered by K sets of intermediate variables, or covers, having a lower resolution than that of $S_i$. If R is a multiple of K such that $R/K=M$, where M is an integer, then each cover except the first has $M+1$ elements, and the first cover has M elements. The elements are arranged in each cover such that:

in a first cover, the first element therein corresponds to the first K lowest (or highest) of the values in the range R, the second element (assuming $M \geq 2$) corresponds to the next K lowest (or highest) of the values, and so on such that the Mth, or last, element corresponds to the K highest (or lowest) of the values; and in a second cover (assuming $K \geq 2$), the first element therein corresponds to the first lowest (or highest) one of the values in the range R, the second element (assuming $M \geq 2$) corresponds to the next K lowest (or highest) of the values, and so on such that the last element corresponds to the $(K-1)$ highest (or lowest) values;

and so on such that, in a Kth cover, the first element therein corresponds to the first $(K-1)$ lowest (or highest) of the values in the range R, the second element (assuming $M \geq 2$) corresponds to the next K lowest (or highest) of the values, and so on such that the last element corresponds to the highest (or lowest) one of the values.

If R is not a multiple of K, such that $R/K=M+T/K$, where M and T are integers, then each of the covers has $M+1$ elements except for the second through $Tth+1$ covers, which have $M+2$ elements. The elements are arranged in each cover such that:

in a first cover, the first of the elements therein corresponds to the first K lowest (or highest) of the values in the range of R, the second element (assuming $M \geq 2$) corresponds to the next K lowest (or highest) of the values, and so on such that the $Mth+1$, or last, element corresponds to the T highest (or lowest) of the values; and in a second cover (assuming $K \geq 2$), the first element therein corresponds to the first lowest (or highest) one of the values in the range, the second element (assuming $M \geq 2$) corresponds to the next K lowest (or highest) of the values, and so on such that the last element corresponds to the $(T-1)$ highest (or lowest) of the values if $T > 1$, or the K highest (or lowest) of the values if $T=1$; and in a third cover (assuming $K \geq 3$), the first element therein corresponds to the first two lowest (or highest) of the values, the second element (assuming $M \geq 2$) corresponds to the next K lowest (or highest) of the values, and so on such that the last element corresponds to the $(T-2)$ highest (or lowest) of the values if $T \geq 2$, or the K highest (or lowest) of the values if $T=2$, or the $(T+K-2)$ highest (or lowest) of the values if $T < 2$;

and so on, such that in a Kth cover, the first element therein corresponds to the first $(K-1)$ lowest (or highest) of the values, the second element (assuming $M \geq 2$) corresponds to the next K lowest (or highest) of the values, and so on such that the last element corresponds to the K highest (or lowest) of the values, if $T=K-1$, or the $T+1$ highest (or lowest) of the values if $T < (K-1)$.

Figure 2:
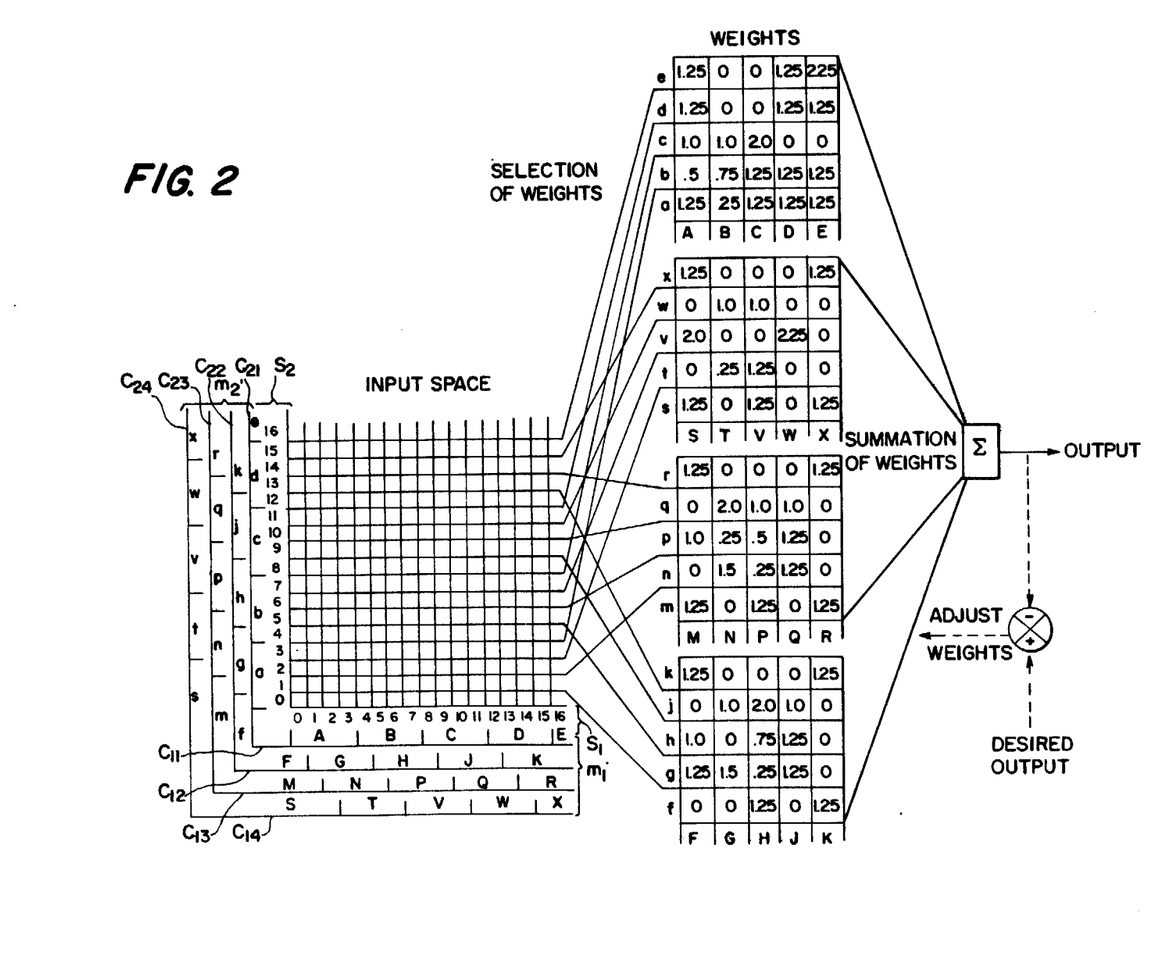
FIG. 2 is a diagrammatic representation of the CMAC mapping algorithm as applied to a two dimensional input vector.

The cover process is illustrated in FIG. 2, which is a diagrammatic representation of the CMAC mapping algorithm for a two dimensional input vector $\underline{S}=(S_1, S_2)$ and $K=4$. As shown, the two input variables $S_1$ and $S_2$ have been given unity resolution on the range 0 to 16. R thus equals 17 for both inputs. The range R of each input variable $S_1$ and $S_2$ is also covered by four covers, $C_{11}, C_{12}, C_{13}$, and $C_{14}$, and $C_{21}, C_{22}, C_{23}$, and $C_{24}$, respectively. That is, for example, $$M_1 = \{C_{11}, C_{12}, C_{13}, C_{14}\}$$

where
$C_{11} = \{A, B, C, D, E\}$
$C_{12} = \{F, G, H, J, K\}$
$C_{13} = \{M, N, P, Q, R\}$
$C_{14} = \{S, T, V, W, X\}$ It can thus be seen that, as noted hereinabove, for every value of $S_i$, there exists a unique set of elements $M^*_i = \{Q_{i1}, Q_{i2}, \ldots Q_{iK}\}$, with one element from each cover, such that the value of $S_i$ uniquely defines the set $M^*_i$, and vice versa. As an illustrative example, the instantaneous value of $S_1 = 7$ maps into the set $M^*_1 = \{B, H, P, V\}$, where $Q_{11}$, the element of cover $C_{11}$ selected by the value $S=7$, is denoted by element B; $Q_{12}$, the element of cover $C_{12}$ selected by the value $S_1 = 7$, is denoted by element H, and so on. Similarly, the value $S_2 = 10$ maps into the set $M^*_2 = \{c, j, q, v\}$, and vice versa.

A preferred method of implementing the cover process comprises the steps of taking the values of $$S_i, (S_i+1), (S_i+2), \ldots (S_i+K),$$

and dividing each by the value of K. The integer portion of the quotient concatenated with the running index j in each case represents the $Q_{ij}$ element selected from the corresponding cover $C_{ij}$.

Figure 3:
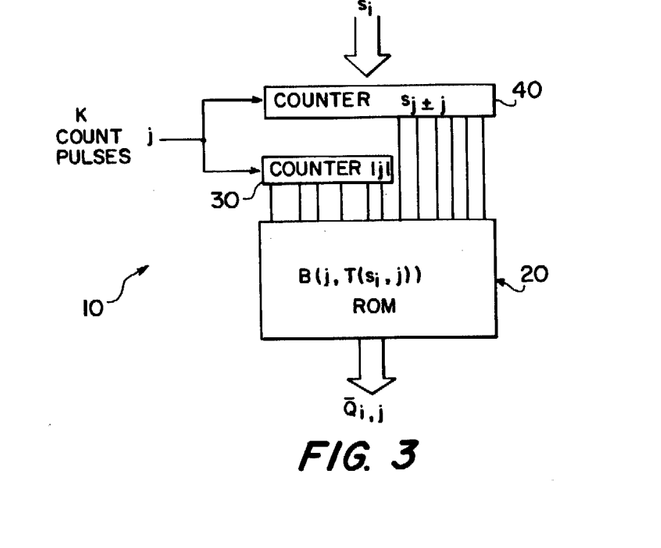
FIG. 3 is a simplified block diagram of apparatus for implementing the $\underline{S} \rightarrow \underline{M}$ mapping algorithm.

Method and apparatus will now be described for accomplishing the $\underline{S} \to A^*_P$ mapping wherein the $M_i$ variables are binary. The method and apparatus are thus especially suited for hardware implementation with microprocessor technology. Referring to FIG. 3, a first embodiment of the apparatus, which is generally denoted 10, comprises addressable storage means, or memory 20, in which hash coded representatives of $Q_{ij}$, i.e., pseudorandom numbers which are uniformly distributed over the range of addresses of the table of weights used to derive the output signal $\underline{P}$, and which are denoted $\overline{Q}_{ij}$, are stored in accordance with a transformation to be described hereinbelow; and a first counter 30, and a second counter 40, the outputs of which are connected in the manner to be described hereinbelow to the address line inputs of memory 20.

Each memory location in memory 20, which may advantageously take the form of a Read Only Memory (ROM), as shown, is defined by a unique combination of first and second address lines from among first and second sets, respectively, of address lines. The values of $\overline{Q}_{ij}$ variables are arranged within the memory such that the value of a $\overline{Q}_{ij}$ is defined by an operator B, wherein $$\overline{Q}_{ij} = B(j, T(S_i, j)),$$

and $$T(S_i, j) = M_q(S_i \pm j)$$

The operator $M_q$ truncates, or masks the q low order bits of the sum/difference ($S_i \pm j$). The value of the index j determines the first address line, and the value of $T(S_i, j)$ determines the second address line. The table of stored values in memory 20 defines the operator B, and thus outputs a character (or number) for every combination of j and $T(S_i, j)$ over the range of the input variables $S_i$, and $1 \leq j \leq K$.

Counter 30 is q bits in length, where $q = \log_2 K$, and all of the outputs thereof are connected to the first set of address lines of memory 20. The contents of counter 30 represent the value of the index j.

Counter 40 is $b+1$ bits in length, where b is the number of bits in the binary equivalent of the largest of the values which an $S_i$ may obtain. Only the $(b-q+1)$ highest order outputs of counter 40 are connected to the second set of address lines of memory 20, and the contents thereof represent $T(S_i, j)$.

In order to perform the $S_i \rightarrow M_i$ mapping, the binary representation of an $S_i$ is loaded into counter 40 and counter 30 is initialized. It is to be noted that the values of $\overline{Q}_{ij}$ may be loaded in memory 20 either such that the initial state of counters 30 and 40 will provide the address of the initial value of $\overline{Q}_{ij}$ to be used in the mapping algorithm, or such that the initial counts in counters 30 and 40 are first changed by a factor of one in order to obtain the initial value of $\overline{Q}_{ij}$ to be used in the mapping algorithm. Assuming that memory 20 is loaded such that the initial states of counters 30 and 40 provide the initial value of $\overline{Q}_{ij}$, the output of memory 20 is obtained. The states of counters 30 and 40 are then changed by incrementing or by decrementing the counts therein by a factor of one. Following each of $(K-1)$ count changes, the output of memory 20 is obtained, which represents the value of $\overline{Q}_{ij}$. At the end of $(K-1)$ count changes, all of the $\overline{Q}_{ij}$ values will have been obtained for the corresponding $S_i$. Obviously, if memory 20 is loaded such that counters 30 and 40 must be incremented in order to obtain the initial value of $\overline{Q}_{ij}$, the counts in counters 30 and 40 would be changed K times in order to obtain all of the $\overline{Q}_{ij}$ values.

The concatenation of the respective elements from each of the $M^*_i$ sets, by which the elements $a_j$ of the set $A^*$ are derived, may be implemented by N separate circuits 10. Each of these circuits 10 produces a $S_i \rightarrow \overline{Q}_{ij}$ mapping for a single input variable, and the respective outputs may be loaded into a long shift register such that the shift register contains the concatenation of the N $\overline{Q}_{ij}$ variables. It is also noted that it is not necessary to store the values of $\overline{Q}_{ij}$ in a memory 20. Instead of the contents of counters 30 and 40 pointing to memory address locations where values representing the $Q_{ij}$ variables are stored, the values of the contents of counters 30 and 40 may themselves be used to define the $Q_{ij}$ variables. Thus, referring to FIG. 4, for each $S_i$, the contents of the corresponding counter 30, representing the index j, and the contents of the $(b-q+1)$ highest order bit locations of the corresponding counter 40, representing $T(S_i, j)$, are concatenated and loaded into a shift register 50 such that the register 50 contains the concatenation of the N $Q_{ij}$ variables, as shown. However, for more than a few input variables, such an approach requires an inordinate amount of circuitry. A more practical, preferred, approach for performing the $\underline{S} \rightarrow A^*_P$ mapping will be described hereinbelow after method and apparatus for implementing the $\underline{A} \rightarrow A^*_P$ mapping have been described.

Concerning the $\underline{A} \rightarrow A^*_P$ mapping, the elements of the set $A^*_P = \{\overline{a}_1, \overline{a}_2, \overline{a}_3, \ldots \overline{a}_K\}$ may be derived by a hash-coding procedure whereby $$\overline{a}_j = H_M(a_j)$$

The operator $H_M$ takes a bit string $a_j$ and uses it to derive a pseudorandom number from a uniform distribution of numbers on the range of addresses of a table of the adjustable weights used to derive the CMAC output.

Figure 4:
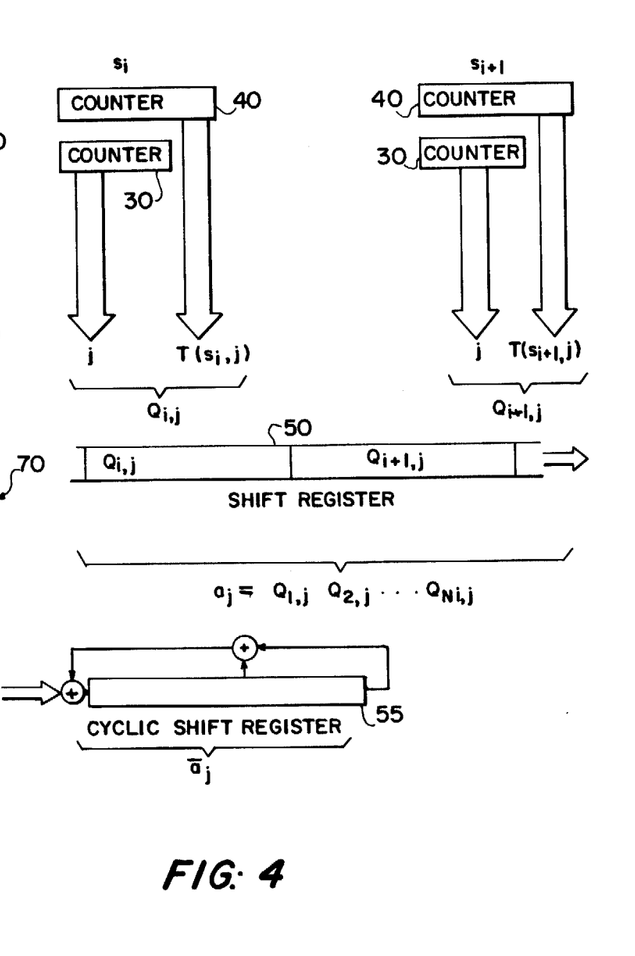
FIGS. 4–8 are simplified block diagrams of apparatus for implementing the $S \rightarrow A^*_P$ mapping algorithm.

Referring to FIG. 4, the hash-coding may be accomplished by shifting shift register 50 containing the elements $a_j$ into a cyclic shift register 55 producing a pseudorandom number $\overline{a}_j$ which is functionally dependent on all the bits in $a_j$. The number of bits in shift register 55 may be arbitrarily chosen to correspond to the number of address bits needed to access the table of weights.

The entire set $A^*_P = \{\overline{a}_1, \overline{a}_2, \ldots \overline{a}_K\}$ is produced sequentially by changing the count in counters 40 and 30 for all the N inputs. As the count of index j is changed K times, the elements $\overline{a}_1$ through $\overline{a}_K$ are produced sequentially in cyclic shift register 55.

A preferred method and apparatus by which the $\underline{S} \rightarrow A^*_P$ is accomplished will now be described with reference to FIG. 5.

The apparatus, generally denoted 12, includes apparatus 10' similar to that shown in FIG. 3. As before, values of $\overline{Q}_{ij}$ are stored in memory 20'. However, instead of being defined by just two address lines, as is the case with memory 20 illustrated in FIG. 3, each memory location in memory 20' is defined by a unique combination of three address lines taken from among first, second, and third sets, respectively, of address lines. The values of the $\overline{Q}_{ij}$ variables are arranged within memory 20' such that the value of a $\overline{Q}_{ij}$ is defined by an operator B', wherein $$\overline{Q}_{ij} = B'(j, T(S_i, j), i),$$

and $T(S_i, j)$ is the same operator incorporated in operator B. The value of the index j determines the first address line, the value of $T(S_i, j)$ determines the second address line, and the value of the index i determines the third address line. The table of values stored in memory 20' defines the operator B', and thus outputs a character (or number) for every combination of j, $T(S_i, j)$, and i over the range of variables $S_i$, $1 \leq j \leq K$, and $1 \leq i \leq N$. The q outputs of counter 30' provide the inputs for the first set of address lines for memory 20'. The $(b-q+1)$ highest order outputs of counter 40' provide the inputs for the second set of address lines, and the r outputs of an additional counter 60, where $r = \log_2 N$, provide the inputs for the third set of address lines. A queue 65 which is K registers long is also provided. The inputs of the first register of queue 65 are connected to the outputs of memory 20' via a logic circuit 70 which exclusive-ors the output of memory 20' with the contents of the last, or Kth, register of queue 65 and enters the result into the first register of queue 65.

To perform the $\underline{S} \rightarrow A^*_P$ mapping for an $\underline{S}$ vector, counters 30' and 40' and the registers in queue 65 are initialized. The binary representation of the first $S_i$ of the S vector is loaded into counter 40'. The output $\overline{Q}_{ij}$ of memory 20', as determined by the contents of counters 30', 40' and 60, as described hereinabove, is entered into the first register of queue 65 via logic circuit 70. The counters 30' and 40' are then pulsed with a count pulse, thus changing (either incrementing or decrementing) the value of the contents thereof by a factor of one. Following each of (K−1) count pulses, the output $\overline{Q}_{ij}$ of memory 20' is entered into the first register of queue 65 via logic circuit 70, which causes the contents of each of the queue registers which has been loaded to be shifted into the next succeeding queue register. Following the (K−1)th count pulse, counter 60 is pulsed with a count pulse thus changing the value of the contents thereof by a factor of one, counter 30' is initialized, and the next $S_i$ is loaded into counter 40'. The same routine described hereinabove in connection with the first $S_i$ is repeated for the next $S_i$ and each succeeding $S_i$ until all N $S_i$ have been processed. Assuming the queue registers have been initialized to zero (which is not necessary), the net result is that the first K elements $\overline{Q}_{ij}$ entered into queue 65 will simply be stored, since until the Kth register of queue 65 is loaded, the exclusive-or operation performed by logic circuit 70 is without effect. After K elements $\overline{Q}_{ij}$ are entered, $\overline{Q}_{1,1}$ will be stored in the Kth register of queue 65, and $\overline{Q}_{1,K}$ will be stored in the first register of queue 65. After K additional elements $\overline{Q}_{ij}$ have been entered into queue 65, $\overline{Q}_{1,1} \oplus \overline{Q}_{2,1}$ will be stored in the Kth queue register, and $\overline{Q}_{1,K} \oplus \overline{Q}_{2,K}$ will be stored in the first queue register. After the elements $\overline{Q}_{ij}$ corresponding to $S_N$ have been entered, queue 65 will contain $\bar{a}_l$ in the Kth register, and $\bar{a}_K$ in the first register.

Figure 5:
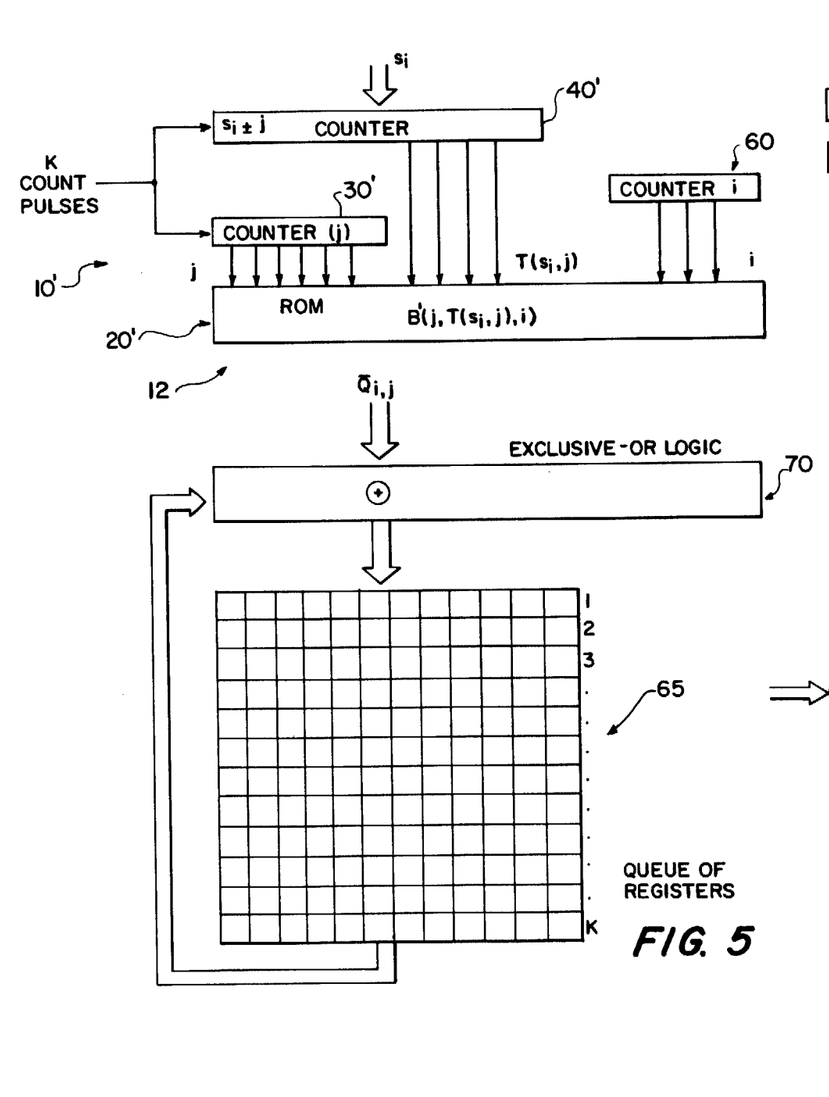

This arrangement makes it possible to have only one set of counters 30' and 40' and one memory 20' as shown in FIG. 5.

Figure 6:
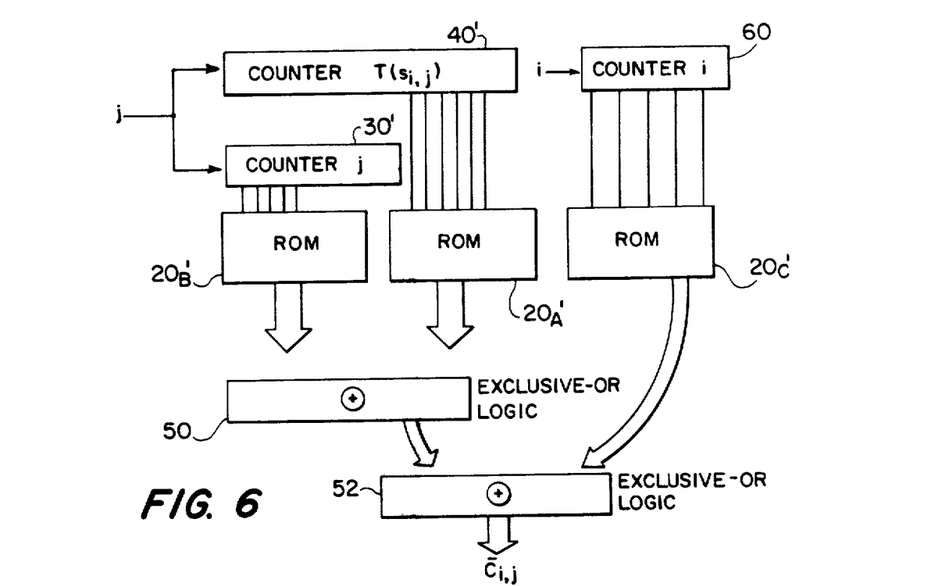
Figure 7:
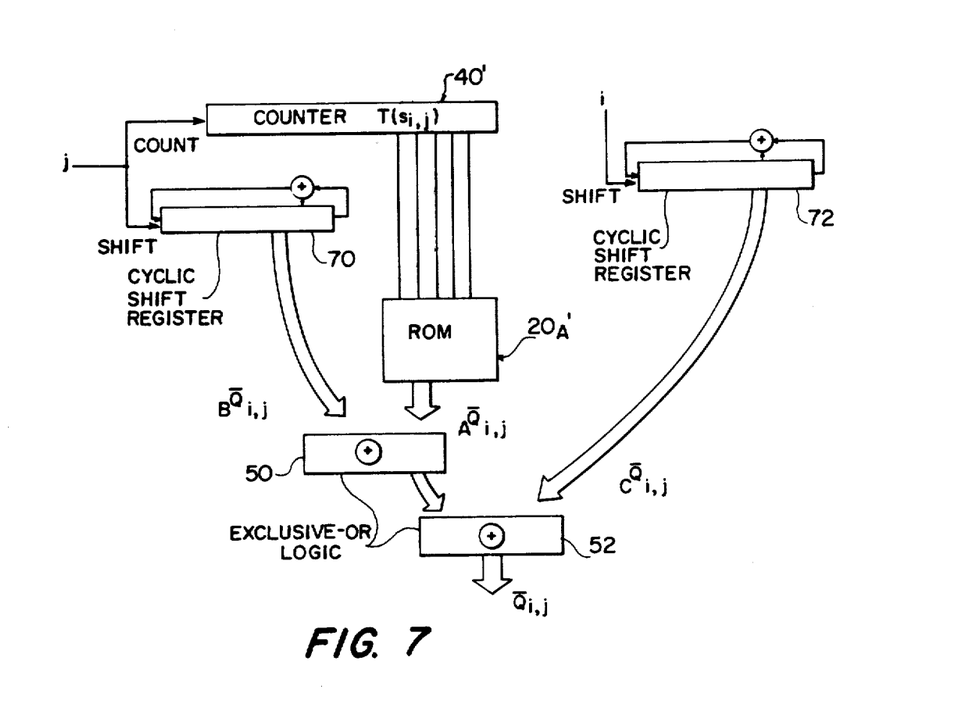
Figure 8:
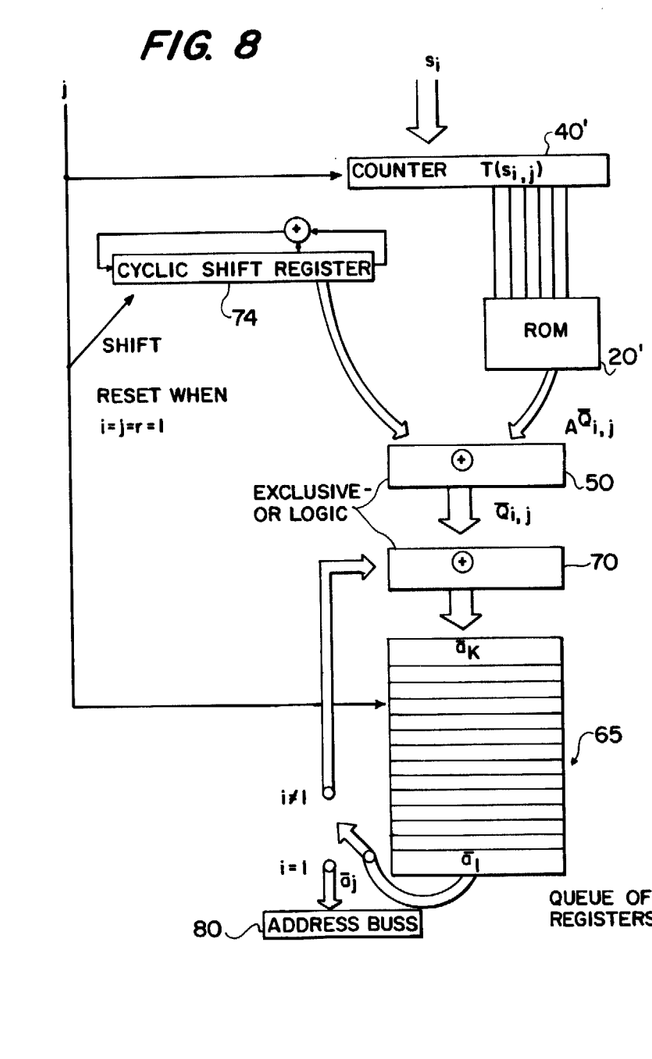

The implementation of CMAC can be further simplified by dividing memory 20' into three smaller memories $20_A'$, $20_B'$, and $20_C'$, each of which contains a random number table, and to which the outputs of counters 30', 40' and 60 are respectively connected, as shown in FIG. 6; and by combining the outputs from the three smaller memories by an exclusive-or operation utilizing two logic circuits, 50 and 52, as shown. The advantage of this approach is that a much smaller amount of memory is required. For example, in a typical CMAC, counter 40' may be six bits in length, and counters 30' and 60, five bits in length. If a single memory 20' is used it must have 16 address bits and hence have $2^{16}$ words of memory. If three memories are used, two need only 32 words and the third only 64 words for a total of 128 words of memory. Furthermore, since counters 30' and 60 address their respective memories, $20_B'$ and $20_C'$ in a fixed sequence, it is possible to replace these counters and their associated memories with cyclical shift registers 70 and 72, as shown in FIG. 7. Finally, since i and j are changed in a fixed pattern with respect to each other, it is possible to replace the two cyclical shift registers 70 and 72 with a single cyclical shift register 74, and to eliminate logic circuit 52, as shown in FIG. 8. This single register 74 is not reset every time j is equal to 1, but rather is simply reset only at those times when i and j are both equal to 1, or, if the CMAC is to produce more than one output, only when i, j, and r are all three equal to 1. Consequently, the apparatus necessary for implementation of the $\underline{S} \rightarrow A^*_P$ mapping can be as simple as that shown in FIG. 8. When i−1, the outputs of the last register in the queue 65 are disconnected from the exclusive-or feedback loop and connected to an address buss 80. The K addresses $\bar{a}_1$ through $\bar{a}_K$ generated by CMAC then appear on address buss 80 in sequence as j is stepped from 1 through K.

If address buss 80 is then simply connected to a memory 85 where the weights are stored, memory 85 will output a series of K weight values. These weight values may be directly presented to an accumulator 90 to be summed, as shown in FIG. 9, thereby deriving the numerical value of the output $$P_r = \sum_{j=1}^{K} W(r, \bar{a}_j)$$

In general, a separate $\underline{S} \rightarrow A^*_P$ mapping is carried out for each output $P_r$, r=1, ... L, since all of the outputs $P_r$ do not have the same degree of functional dependence on all of the outputs $S_i$. In a manipulator control, for example, a particular output may be strongly dependent on one or two inputs (in that it changes rapidly as those inputs change) and only weakly dependent on others.

The degree of dependence of each output $P_r$ on each input $S_i$ may be expressed in a relevance matrix. In the embodiment of CMAC illustrated in FIG. 9, a memory 100 is loaded with a predetermined relevance matrix. The outputs 1–5 of memory 100, which are determined by inputs 102 and 104, representing the values of N and L, respectively, are used to control the resolution of the $S_i \rightarrow M^*_i$ mappings for each input and for each output. In one embodiment of the CMAC (not shown), the contents of the relevance matrix can be used to divide (or shift to the left) the $S_i$ variable before it is entered into register 40. In the embodiment of CMAC illustrated in FIG. 9, counter 40' is capable of accepting counts at one of several inputs under control of a logic circuit 95 triggered by the outputs 1–5 of relevance memory 100, and certain of the (b−q+1) outputs of counter 40' are controlled by gates 98 triggered by the outputs 1–5 of relevance memory 100, as shown more clearly in FIG. 10.

Figure 9:
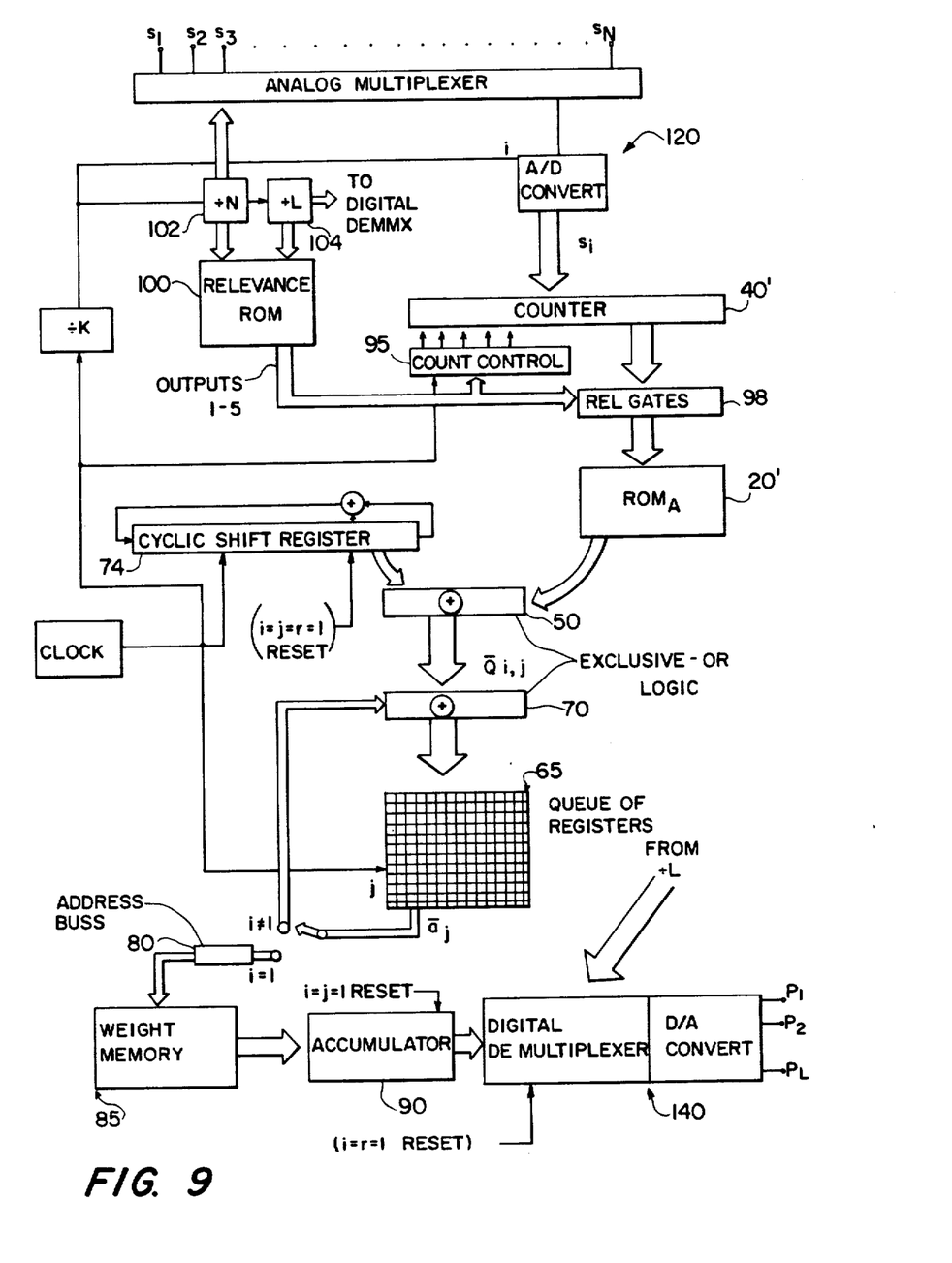
FIG. 9 is a simplified block diagram of apparatus for implementing the complete $\underline{S} \rightarrow \underline{P}$ mapping algorithm.
Figure 10:
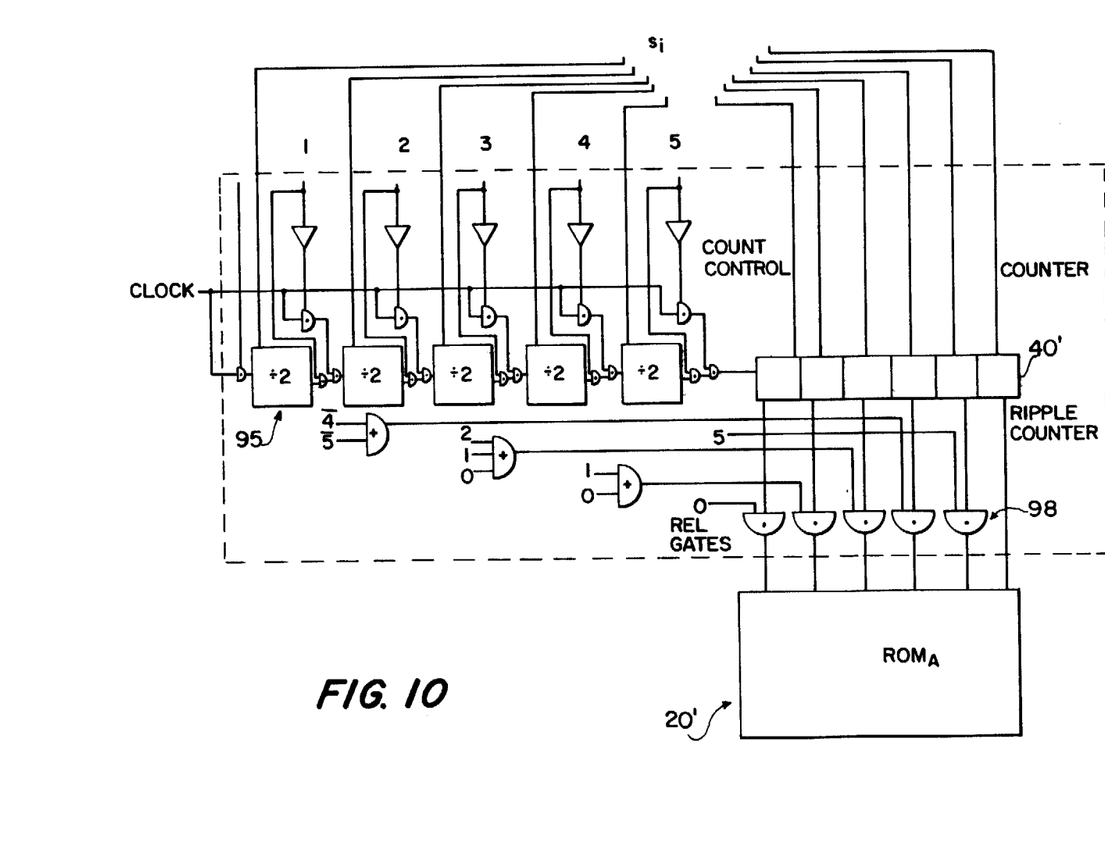
FIG. 10 is a schematic diagram of a portion of the apparatus illustrated in FIG. 9.

With the embodiment of CMAC illustrated in FIGS. 9–10, it is not necessary to shift $S_i$ before entering the variable into counter 40', since an effective shifting can be accomplished by selecting the input in counter 40' at which counts are accepted and by selecting which of the (b−q+1) outputs of counter 40' are inhibited by gates 98.

In practice, CMAC may also be provided with conventional analog multiplexing and analog-to-digital conversion input circuitry, generally denoted 120 in FIG. 9, and with conventional digital demultiplexing and digital-to-analog conversion output circuitry, generally denoted 140, as required.

Although the invention has been described with respect to exemplary embodiments thereof, it will be understood that variations and modifications can be effected in the embodiments without departing from the scope or spirit of the invention.

I claim:

1. A machine implemented method of addressing, in dependence on an input signal comprising at least one variable $S_i$, a distributed storage memory in an adaptive control system wherein a set of control signal values is stored such that each of the stored values is distributed over a unique set $A^*_P$ of K physical memory locations, more than one stored value may share an individual memory location $\bar{a}_j$, and the degree of overlap between sets $A^*_P$ corresponds to the degree of similarity between input signals, the method comprising the steps of:
for each variable $S_i$:

(1) loading a first register having at least $b+1$ bits with the binary equivalent of the input variable $S_i$, where b represents the number of bits in the binary equivalent of the largest of the values which an input variable $S_i$ may obtain;

(2) initializing a second register having q bits, where $q=\log_2 K$, and the contents of the second register constitute the count of an index j;

(3) obtaining a value $Q_{ij}$ by outputting the contents of the second register as the lowest order bits of the value $Q_{ij}$, and the contents of the $(b-q+1)$ bit locations of the first register as the highest order bits of the value $Q_{ij}$;

(4) transferring all of the values $Q_{ij}$ into a shift register having $N(b+1)$ bits such that the shift register contains the concatenation of the values $Q_{ij}$;

(5) shifting the contents of the shift register into a cyclic shift register connected so as to produce a pseudorandom number as a result of the shifting of the contents thereof; thereby obtaining memory location $\bar{a}_j$;

(6) changing the contents of the first and second registers by incrementing or decrementing the value thereof by by a factor of one;

(7) repeating for each variable $S_i$ the sequence of steps (3)-(6) (K-1) times, thereby obtaining all of the memory locations $\bar{a}$ in the set $A^*_P$.

2. A machine implemented method of addressing, in dependence on an input signal comprising at least one variable $S_i$, a distributed storage memory in an adaptive control system wherein a set of control signal values is stored such that each of the stored values is distributed over a unique set $A^*_P$ of K physical memory locations, more than one stored value may share an individual memory location $\bar{a}_j$, and the degree of overlap between sets $A^*_P$ corresponds to the degree of similarity between input signals, the method comprising the steps of:

(1) loading a first register having at least $b+1$ bits with the binary equivalent of the first variable $S_i$, where b represents the number of bits in the binary equivalent of the largest of the values which a variable $S_i$ may obtain;

(2) initializing a second register having q bits, where $q=\log_2 K$ and the contents of the second register constitute the count of an index j;

(3) initializing a third register having r bits, where $r=\log_2 N$, and N represents the number of variables $S_i$, and the contents of the third register constitute the count of an index i;

(4) initializing a queue of K storage registers, the queue being constructed such that the entry of a value into the first register thereof causes the contents of each queue register containing a value to be shifted into the next succeeding queue register;

(5) obtaining a value by outputting the contents of the second register as the lowest order bits of the value, outputting the contents of the $(b-q+1)$ highest order bits of the first register as the next lowest order bits of the value, and outputting the contents of the third register as the highest order bits of the value;

(6) addressing a memory in which is stored a table of pseudorandom numbers with said value, thereby obtaining a value $\bar{Q}_{ij}$;

(7) (a) exclusive-oring the value $\bar{Q}_{ij}$ which is obtained with the contents of the Kth register of the queue,
(b) entering the result obtained from the exclusive-oring step (a) in the first register of the queue, (8) changing the contents of the first and second registers by incrementing or decrementing the value thereof by one;

(9) repeating the sequence of steps (5)-(8) (K-1) times, thereby resulting in K values $\bar{Q}_{i1}, \ldots \bar{Q}_{iK}$ being entered into the queue;

(10) changing the contents of the third register by incrementing or decrementing the value thereof by one;

(11) loading the first register with the binary equivalent of the next succeeding variable $S_i$, and initializing the second register;

(12) repeating the sequence of steps (5)-(11) (N-1) times such that the contents of the Kth queue register designate memory location $\bar{a}_1$ of set $A^*_P$, the contents of the (K-1) queue register designate memory location $\bar{a}_2$ of set $A^*_P$, and so on such that the contents of the first queue register designate memory location $\bar{a}_K$ of set $A^*_P$.

3. A machine implemented method of addressing, in dependence on an input signal comprising at least one variable $S_i$, a distributed storage memory in an adaptive control system wherein a set of control signal values is stored such that each of the stored values is distributed over a unique set $A^*_P$ of K physical memory locations, more than one stored value may share an individual memory location $\bar{a}_j$, and the degree of overlap between sets $A^*_P$ corresponds to the degree of similarity between input vectors, the method comprising the steps of:

(1) initializing a queue of K storage registers, the queue being constructed such that the entry of a value into the first register thereof causes the contents of each queue register containing a value to be shifted into the next succeeding queue register;

(2) initializing a cyclic shift register having K bits and which is connected so as to produce a pseudorandom number as a result of a shifting of the contents thereof, and beginning with variable $S_i$;

(3) loading an addressing register having at least $b+1$ bits with the binary equivalent of the variable $S_i$, where b represents the number of bits in the binary equivalent of the largest of the values which a variable $S_i$ may obtain;

(4) addressing an addressable memory having a plurality of memory locations in which a set of pseudorandom numbers are stored, the numbers in the set being unique and uniformly distributed over the range of the values which memory locations $\bar{a}$ may assume, and each memory location of the addressable memory being addressed by a unique address line which is defined by the contents of the $(b-q+1)$ highest order bit locations of the addressing register, where $q=\log_2 K$;

(5) performing a first exclusive-or operation wherein the output of the memory location addressed by the addressing of step (4) is exclusive-ored with the output of the cyclic shift register;

(6) performing a second exclusive-or operation wherein the result obtained from the first exclusive-or operation of step (5) is exclusive-ored with the contents of the Kth register in the queue;

(7) entering the result obtained from the second exclusive-or operation of step (6) into the first register of the queue;
(8) shifting the shift register so as to produce a new pseudorandom number;
(9) changing the contents of the addressing register by incrementing or decrementing the value thereof by a factor of one;
(10) repeating steps (5)–(9) (K−1) times;
(11) loading the addressing register with the binary equivalent of the next variable $S_i$;
(12) repeating steps (5)–(11) (N−1) times, such that values designating memory locations $\bar{a}_l$ through $\bar{a}_K$ are stored sequentially in the queue of registers with the value designating memory location $\bar{a}_l$ stored in the last register of the queue and the value designating memory location $\bar{a}_K$ stored in the first register of the queue following the last repetition of the storing step.

* * * * *